(No Model.)
P. E. GETZ & T. J. AMOS.
STEAM COOKER.
No. 574,533.  Patented Jan. 5, 1897.
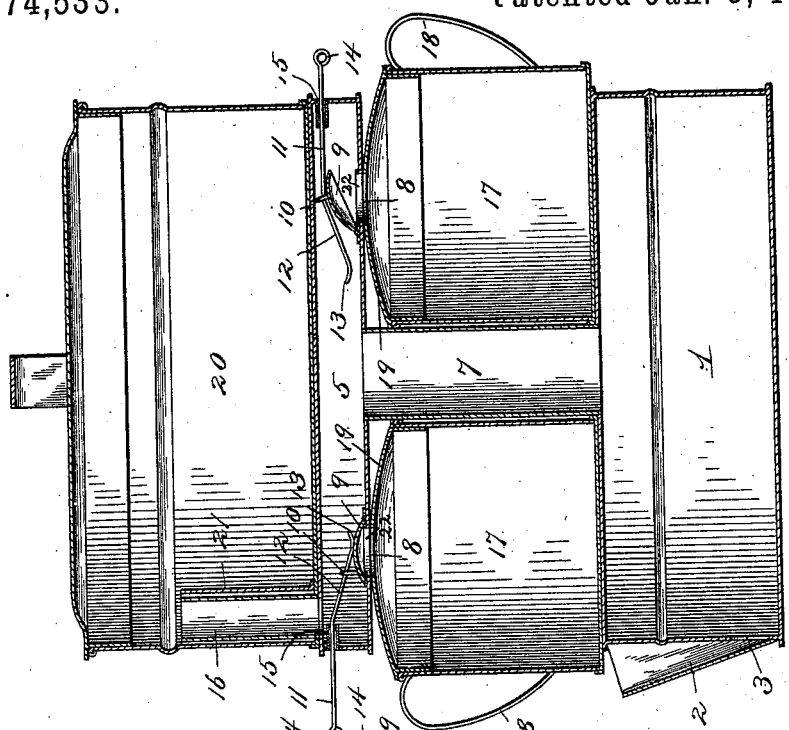
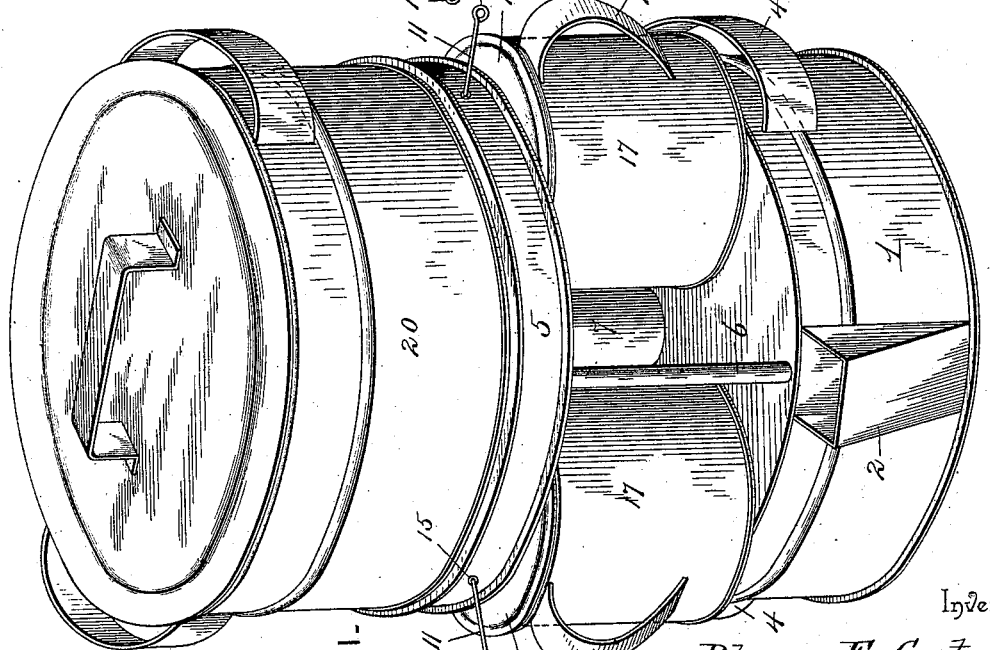
Witnesses
Harry L. Ames.
V. B. Hillyard
Inventors
Phares E. Getz and
Thomas J. Amos.
By their Attorneys,
C. A. Snow & Co.

UNITED STATES PATENT OFFICE.

PHARES E. GETZ AND THOMAS J. AMOS, OF BENTONVILLE, ARKANSAS.

STEAM-COOKER.

SPECIFICATION forming part of Letters Patent No. 574,533, dated January 5, 1897.

Application filed April 9, 1896. Serial No. 586,865. (No model.)

*To all whom it may concern:*

Be it known that we, PHARES E. GETZ and THOMAS J. AMOS, citizens of the United States, residing at Bentonville, in the county of Benton and State of Arkansas, have invented a new and useful Steam-Cooker, of which the following is a specification.

This invention relates to certain new and useful improvements in utensils designed for cooking by steam, and has for its object to prevent burning the hand when removing or placing in position the individual vessels in which the cooking is accomplished, to prevent the flavor of one kind of food permeating another food cooking at the same time, to economize heat and space, to have the vessels so disposed that any one can be removed or placed in position without disturbing the remaining vessels, to enable any vessel to be cut off from a supply of steam without necessitating its removal, and, lastly, to improve and increase the usefulness of this class of devices.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a steam-cooker for attaining the objects of this invention. Fig. 2 is a vertical central section thereof.

Corresponding and like parts are referred to in the following description and indicated in the views of the accompanying drawings by the same reference-characters.

The steam-generator or boiler 1 is shallow and of circular outline and preferably of a size to be fitted to a stove-opening, although this is not essential, as it may be placed upon the top of a range, gasolene, or other stove. A spout 2 is provided on one side of the generator and communicates at its lower end with the generator by means of an opening 3 in the side of the generator, near the bottom thereof. Water is supplied to the generator by being poured into the spout 2 and is removed therefrom in a similar way. Handles 4 are located at diametrically opposite points for convenience in moving and carrying the cooker when the latter is heated. A steam-distributing chamber 5 is located above the generator, and is connected therewith by uprights 6 and by means of a central tube 7, the latter being comparatively large and establishing communication between the steam-distributing chamber and generator.

The condenser is shallow and approximates the outline of the generator, and is formed in its bottom side with a series of valve-controlled openings 8, the valves 9 for closing the openings 8 being hinged at one edge and having a loop 10 at or near the opposite edge to receive a lifter 11, by means of which the valves are positively opened and closed when required. Each lifter is composed of a stout spring-wire, having its inner end 12 bent and its terminal portion 13 curved and its outer end formed with a projection 14 in the shape of an eye formed by bending the terminal portion of the wire, and the said lifter being slidably mounted in an opening in an edge or side of the steam-distributing chamber, said opening having a sleeve or gland 15 to afford an extended bearing for the lifter, so as to direct it in its sliding movements.

Upon moving the lifter 11 inward, as shown at the right-hand side of Fig. 2, the valve will be opened by reason of the inclined or bent end 12 engaging with the loop 10, and upon drawing the lifter outward, as shown at the left-hand side of Fig. 2, the valve will be closed, due to the curved terminal 13 riding upon the top side thereof. A small pipe 16 rises from the top side of the steam-distributing chamber, preferably near the edge or side thereof, and when not in use is to be closed by a stopper or other suitable closure generally provided in this and analogous devices.

A series of vessels 17 of corresponding shape, having handles 18 and covers 19, are adapted to be fitted into the space formed between the top side of the generator and the bottom side of the steam-distributing chamber, and are intended to receive the food or article to be steamed or cooked. The covers 19 of these vessels have openings to register with the valve-controlled openings 8, so that when the vessels are properly positioned and the valves 9 opened steam will pass from the steam-distributing chamber into the vessels and cook or steam the article contained therein. If it be required to cut off the steam from any vessel, either to permit its removal or to stop the steaming or cooking process, a proper manipulation of the lifter controlling the damper opposite thereto will effect the desired end, as will be readily understood from the foregoing detailed description.

A large receptacle 20 for receiving a ham, large fowl, or other bulky article is adapted to be placed upon the steam-distributing chamber and has an opening in its bottom to receive the pipe 16, said opening being protected by a housing 21 to prevent the escape of the fluid contents of the said receptacle when the latter is in use. When the receptacle 20 is not required for service, the end of the pipe 16 will be closed in any suitable way, so as to concentrate the steam and prevent a waste of heat.

The chamber 5 serves to remove the excess of moisture from the steam before the latter passes into the receptacle or vessels containing the food or article to be steamed, the water of condensation flowing back into the generator through the central tube 7. By this means the effective steam enters the receptacle or vessels in a comparatively dry state, thereby hastening the cooking or steaming process. The valves admit of the vessels being placed in position at different times and removed from the cooker at pleasure while the generator is in service without causing any loss of steam or without detriment to the remaining vessels. To insure a snug fit between the covers 19 and the bottom side of the steam-distributing chamber, the said covers 19 are convex and the openings therein are located centrally, and the distance between the opposing sides of the parts 1 and 5 corresponds to the height of the vessels when the covers are in position. The number of the vessels 17 will depend upon the capacity of the steamer.

To prevent the water of condensation from entering the vessels 17 when the latter are in place, the valve-controlled openings 8 are surrounded by a vertical flange or ring 22, the latter projecting vertically from the bottom of the chamber 5 and formed by turning the edge portion of the bottom bordering upon the openings upward.

Having thus described the invention, what is claimed as new is—

1. A steam-cooker comprising a generator, a steam-distributing chamber placed above and overhanging the generator and in communication therewith, and a vessel removably fitted into the space formed between and held in place by the overhanging portion of the steam-distributing chamber and the generator, and receiving a supply of steam from the said chamber, substantially as and for the purpose set forth.

2. A steam-cooker comprising a generator, a steam-distributing chamber in communication with the generator and located above the same, and having an opening in its bottom side, and a vessel removably fitted into the space formed between the generator and steam-distributing chamber and having its cover convex on its outer side and apertured to form a close connection with the said opening in the bottom side of the steam-distributing chamber, substantially as and for the purpose set forth.

3. In a steam-cooker, the combination with a generator, and a steam-distributing chamber placed above and in communication with the generator, and having a valve-controlled opening in its bottom side, of a vessel adapted to be fitted into the space formed between the generator and the steam-distributing chamber and having an opening in its top to register with the valve-controlled opening of the said steam-distributing chamber, substantially as set forth and for the purpose described.

4. In a steamer, the combination with a part having an opening for the escape of steam, of a valve for closing the said opening, and a slidably-mounted lifter having a bent portion in engagement with the valve to open and close the latter at the pleasure of the user, substantially as and for the purpose set forth.

5. In a steamer, the combination with a part having an opening for the egress of steam, of a valve for closing the said opening and having a loop, and a lifter slidably mounted and having a bent portion operating through the said loop, and a curved terminal to ride upon and close the said valve, substantially in the manner and for the purpose set forth.

6. The herein-described steam-cooker, comprising a generator, a steam-distributing chamber located above the generator and having communication therewith, valves for closing openings in the bottom side of the steam-distributing chamber, lifters slidably mounted in the sides of the steam-distributing chamber for positively opening and closing the said valves, vessels having apertured covers and adapted to be fitted into the space formed between the generator and steam-distributing chamber, a pipe rising from the steam-distributing chamber, and a receptacle adapted to be placed upon the steam-distributing chamber and having a housed opening to receive the said pipe, substantially as and for the purpose set forth.

In testimony that we claim the foregoing as our own we have hereto affixed our signatures in the presence of two witnesses.

PHARES E. GETZ.
THOMAS J. AMOS.

Witnesses:
T. O. TUCKER,
C. R. CRAIG.